Dec. 29, 1964  M. GOTTSEGEN  3,163,338
COMBINATION VEHICULAR AND PORTABLE INSULATED
FOOD AND BEVERAGE CONTAINER
Filed Nov. 7, 1962  2 Sheets-Sheet 1
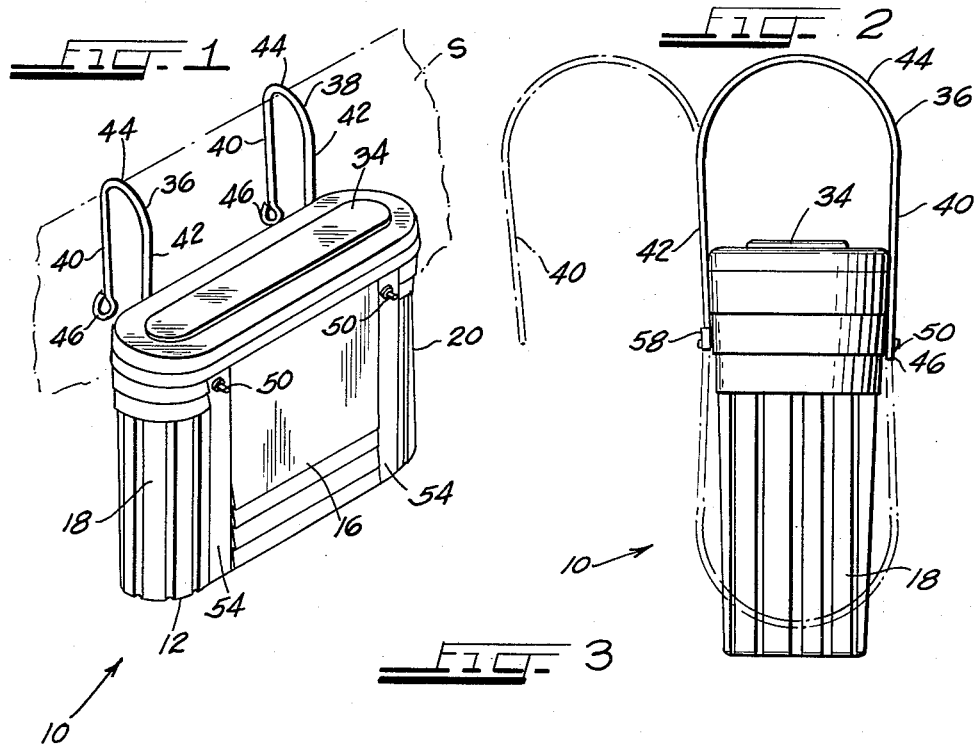
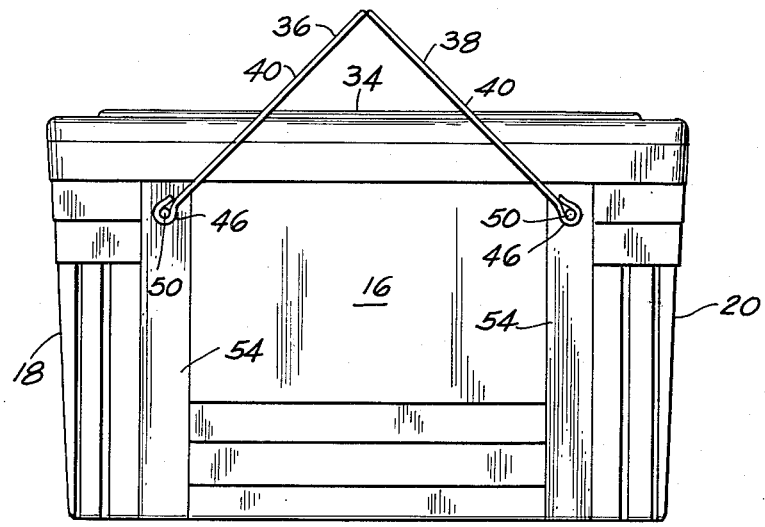
INVENTOR.
MARTEN GOTTSEGEN

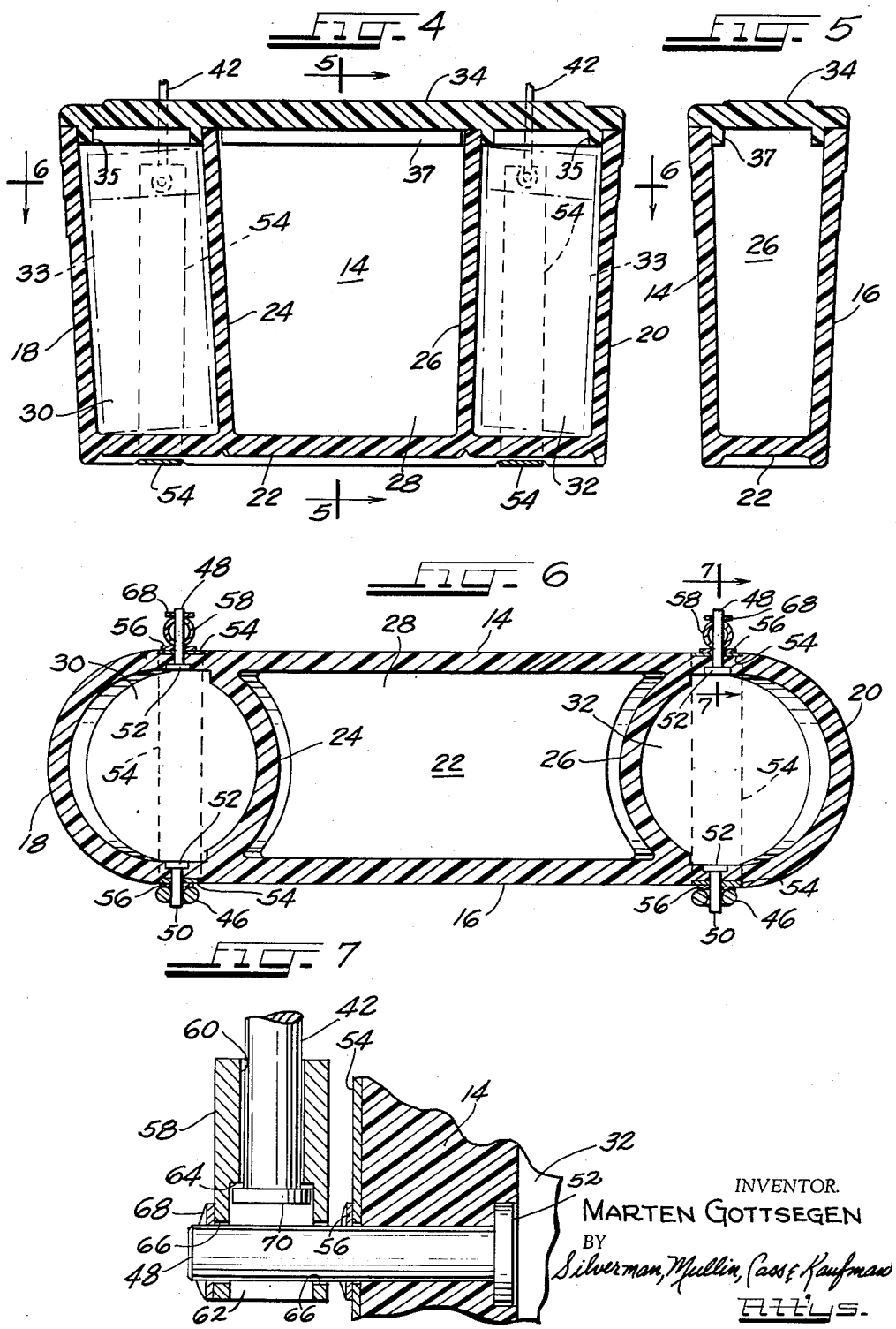

United States Patent Office 3,163,338
Patented Dec. 29, 1964

3,163,338
COMBINATION VEHICULAR AND PORTABLE INSULATED FOOD AND BEVERAGE CONTAINER
Marten Goifsegen, Chicago, Ill., assignor to Gotham Industries, Inc., Chicago, Ill., a corporation of New York
Filed Nov. 7, 1962, Ser. No. 236,088
11 Claims. (Cl. 224—42.01)

This invention relates generally to canteen-type containers which are manually transportable but are likewise capable of being removably mounted in an automobile or the like. More particularly, the invention relates to an insulated container comprising an improvement of the type shown in United States Patent No. 2,645,392, and of which I was a co-inventor.

In general, the container described in the aforementioned patent comprised a lightweight and compact receptacle having a plurality of compartments therein. The compartments were adapted to accommodate edible foods as well as one or more suitable beverage containers such as vacuum bottles. A pair of bent wire handle members were pivotally connected to the container to afford hangers for conveniently mounting the container on the back of an upholstered automobile seat or the like. The handle members were likewise adapted to cooperate and afford a convenient carrying handle whereby the container could be readily converted into a manually transportable device.

Although the container of said patent has answered a long felt need, and has enjoyed considerable commercial success, the same was nonetheless characterized by certain disadvantageous features which have limited even greater acceptance thereof. Thus, for example, the prior container was not insulated so that relatively expensive vacuum type bottles or the like were required to store liquids and maintain the desired temperatures thereof. Similarly, desired temperatures of edible foods could not be maintained, and the container was also completely inadequate for storing a supply of a cooling agent such as ice cubes. Of course, making the customary metal or wooden container into an insulated container would have entailed such a great increase in size, weight and/or cost, that the practicability thereof would have been completely destroyed.

It is therefore an important object of this invention to provide an improved combination vehicular and portable food and beverage container which overcomes all of the disadvantages described hereinabove.

Another important object of the invention is to afford an improved combination vehicular and portable food and beverage container which is fully insulated and most efficient for maintaining desired temperatures throughout the container.

A further object is to provide an insulated container of the character described in which liquids may be efficiently stored in ordinary and inexpensive containers made of plastics, glass, metals, etc., so that expensive vacuum-type bottles are no longer required for this purpose.

Still another object is to afford an insulated container of the character described in which edible foodstuffs likewise may be stored and maintained at desired temperatures.

Yet a further object is to provide an insulated container of the character described which may be utilized for storing and efficiently maintaining a supply of a cooling agent, such as ice cubes.

Still a further object is to afford an insulated container of the character described which is extremely light in weight, compact in size, and not subject to rusting, mildew, or other corrosive influences common in metal or wood structures.

Yet another object is to provide an insulated container of the character described which may be quite inexpensively fabricated and yet is most efficient for the purposes intended.

With the foregoing and other objects in view which will appear as the description proceeds, the invention consists of certain novel features of construction, arrangement and a combination of parts hereinafter fully described, illustrated in the accompanying drawings, and particularly pointed out in the appended claims, it being understood that various changes in the form, proportion, size and minor details of the structure may be made without departing from the spirit or sacrificing any of the advantages of the invention.

For the purpose of facilitating an understanding of my invention, I have illustrated in the accompanying drawings a preferred embodiment thereof, from an inspection of which, when considered in connection with the following description, my invention, its mode of construction, assembly and operation, and many of its advantages should be readily understood and appreciated.

Referring to the drawings in which the same characters of reference are employed to indicate corresponding or similar parts throughout the several figures of the drawings:

FIG. 1 is a perspective view of a combination vehicular and portable insulated food and beverage container embodying the principles of the invention, and showing the same removably supported on the back of an upholstered automobile seat indicated in fragmentary dotted outline;

FIG. 2 is an end elevational view of the container with one of the bent wire members attached and functioning as a handle member, and showing in dotted outline other possible positions for said bent wire member;

FIG. 3 is a side elevational view showing the bent wire members cooperating to afford a carrying handle for the container;

FIG. 4 is a vertical sectional view of the container showing the internal construction thereof and showing the liquid storage bottles in dotted outline;

FIG. 5 is a sectional view taken on the plane of line 5—5 in FIG. 4 with certain parts omitted for convenience of illustration;

FIG. 6 is an enlarged sectional view taken on the plane of line 6—6 in FIG. 4 and viewed in the direction indicated; and FIG. 7 is a further enlarged fragmentary sectional view taken on the plane of line 7—7 in FIG. 6, viewed in the direction indicated, and illustrating the novel pivot joints and attaching means for the bent wire members.

Referring to FIG. 1 of the drawings, the reference numeral 10 indicates generally a combination vehicular and portable insulated food and beverage container embodying the principles of the invention. The container 10 comprises an open-topped housing 12 which may be of any suitable outer configuration, and in the embodiment illustrated the housing includes a pair of slightly tapering side walls 14 and 16 connected by a pair of generally arcuate end walls 18 and 20, and a bottom wall 22.

As indicated in FIGS. 4 and 5 of the drawings, the housing 12 may likewise include a pair of arcuate inner walls such as 24 and 26, which cooperate with the arcuate end walls and side walls to provide a central storage compartment 28 and a pair of cylindrical beverage storage compartments 30 and 32 at the ends thereof. The beverage storage compartments 30 and 32 are adapted to accommodate therein suitable beverage containers, such as 33, indicated in dotted outline in FIG. 4 of the drawings.

A cover 34 is removably associated with the housing 12 for closing the container 10. It is important to note that the cover is provided with a plurality of depending ridges such as 35, 35 and 37 which are adapted to be nicely received in frictional relationship with adjacent portions of the walls, 18, 20, 24 and 26 within the compartments 30, 28 and 32 as indicated. It may thus be appreciated that the operationally positioned cover 34 renders the housing 12 substantially airtight. Preferably the entire housing 12 may be molded from one of the new lightweight and inexpensive plastic materials, such as expanded polystyrenes or foam styrenes. The cover 34 is likewise integrally molded from the same materials. These materials are extremely lightweight and have excellent insulating qualities, so that the cover-closed container, including all three compartments therein, is fully insulated. As a result, the beverage containers 33 may be non-insulated and made of inexpensive materials such as polyethylenes, glass, metals, etc., and still be capable of maintaining the desired temperatures of liquids stored therein. Similarly, the central storage compartment 28 is adapted to accommodate edible foodstuffs or even a supply of ice cubes, and efficiently maintains the desired temperatures thereof. Since each of the compartments 28, 30 and 32 has its own insulated airtight integrity, it is also possible to store cold materials such as ice cubes in one compartment such as 28, while simultaneously storing hot liquids in the beverage compartments 30 and 32.

For the purpose of supporting the container 10 from the back of an automobile seat such as S, shown in dotted outline in FIG. 1, a pair of novel hanger members 36 and 38 are provided. Each of these hanger members may be formed from a length of wire bent into substantially inverted U-shape, so that each has a pair of substantially vertical legs 40 and 42 connected by an arcuate segment 44. The free ends of the legs 40 may terminate in an eyelet 46 for purposes which will become apparent as the description proceeds. It is important to note, as indicated in FIG. 2, that the legs 40 and 42 are normally slightly convergent or bent toward each other. However, it may be appreciated that because of the resiliency of the bent wire member 36, the legs 40 and 42 may be slightly spread apart temporarily when desired. The importance of this construction will likewise become apparent as the description proceeds.

Referring now to FIG. 6 of the drawings, it will be seen that pairs of aligned mounting bolts 48, 48 and 50, 50 are positioned at each end through the side walls 14 and 16 respectively of the housing 12. All of the mounting bolts may be of identical construction, and it will be noted that the same are provided with an enlarged head 52 which may be countersunk into the cork-like plastic walls 14 and 16. For purposes of reinforcing the relatively soft housing structure and preventing the tearing or breaking thereof by the bolts 48 and 50, thin metal reinforcing bands 54, 54 may be wrapped in snug contour-accommodating relationship around the side walls 14 and 16 and bottom wall 22 as indicated. The mounting bolts 48 and 50 are likewise positioned through aligned openings formed in the reinforcing bands 54, and suitable lockwashers such as 56 may be employed for locking the bolts in operational position.

Rotatably mounted on each of the bolts 48 is a pivot joint 58. The pivot joint 58 comprises a cylindrical sleeve having a central longitudinal bore 60, said bore 60 including an enlarged diameter portion 62 to afford an annular shoulder 64 (see FIG. 7). A pair of diametrically opposed holes 66 is provided in the sleeve at said enlarged diameter portion for accommodating the bolt 48 therethrough, and a lock washer such as 68 may be employed for operationally retaining the pivot joint on the bolt. It will thus be appreciated that the pivot joints 58 are free to rotate on their respective bolts 48.

As indicated in FIG. 7, the leg 42 of each of the hanger members 36 and 38 is provided with an enlarged head 70 at the free end thereof. Each leg 42 is rotatably mounted in the bore 60 of its associated pivot joint 58, and the enlarged head 70 cooperates with the annular shoulder 64 for operationally retaining the same therein. It will thus be appreciated that each of the legs 42 is capable of free rotation about a substantially vertical axis within its associated pivot joint 58.

Operation of the novel hanger members 36 and 38 may now be fully appreciated. Thus, when it is desired to support the container 10 on a supporting surface such as an automobile seat S, the hanger members 36 and 38 are merely hung over said seat as indicated in FIG. 1 of the drawings. In this condition, the cover 34 may of course be removed, and the container functions as a server. It is important to note that the center of gravity of the container is so fixed that when the container is hung as indicated in FIG. 1, the same is naturally positioned in an inclined vertical plane parallel to the plane of the back of the seat S.

To render the container portable, it is merely necessary to lift the hanger members 36 and 38 free of the seat S and then rotate each of them outwardly until its eyelet 46 abuts the end of the associated mounting bolt 50. The legs 40 may now be temporarily urged outwardly to align the eyelets 46 with the bolts 50. Upon release of the legs 40, the natural resiliency of the hanger members causes said legs to return to their normal position so that eyelets 46 are efficiently and rotatably mounted on the bolts 50. In this condition, the legs 40 cannot inadvertently slip off of the bolts 50, so that the hanger members 36 and 38 can be pivoted toward each other to afford a carrying handle for the container as shown in FIG. 3 of the drawings. Similarly, the hanger members may be pivoted outwardly and away from each other so that the cover 34 may be removed when desired (see FIG. 2).

From the foregoing description and drawings, it should be apparent without further description that I have provided a novel and improved food and beverage container which may be readily converted from a portable container to one which can be removably supported on the back of an automobile seat or the like. The novel pivot joints and mounting means permit the hanger members to readily function both as hangers and carrying handles. In addition, the container is fully and efficiently insulated, and yet is extremely lightweight, compact and relatively inexpensive to manufacture.

It is believed that my invention, its mode of construction and assembly, and many of its advantages should be readily understood from the foregoing without further description, and it should also be manifest that while a preferred embodiment of the invention has been shown and described for illustrative purposes, the structural details are nevertheless capable of wide variation within the purview of my invention as defined in the appended claims.

What I claim and desire to secure by Letters Patent of the United States is:

1. A combination vehicular and portable container comprising an insulated housing having a pair of opposed side walls, a pair of bent wire members, connector means connecting one end of said members to one of said side walls so that said end is simultaneously rotatable about a substantially vertical axis and a horizontal axis substantially normal to said one side wall, said members affording a pair of hangers for said container, mounting members on the opposite of said side walls, and means on the free ends of said bent wire members for cooperating with said mounting members to releasably and rotatably engage the same, said bent wire members being rotatable about a substantially vertical axis to a position wherein said last mentioned means engage said mounting members whereby said bent wire members are rotatable about a horizontal axis and cooperate to afford a carrying handle for said container.

2. The container of claim 1 in which said mounting members comprise a pair of bolts projecting outwardly through said opposite side wall and said last mentioned means comprises an eyelet integrally formed on the free end of each of said bent wire members.

3. The container of claim 1 in which said connector means comprises a pair of pivot joints rotatably mounted on said one side wall, each of said pivot joints being rotatable about a substantially horizontal axis.

4. The container of claim 3 in which said one end of each of said bent wire members is rotatably connected to one of said pivot joints.

5. A combination vehicular and portable container comprising an insulated housing having a pair of opposed side walls, a pair of mounting bolts projecting outwardly from one of said side walls adjacent opposite ends thereof, a pivot joint mounted on each of said mounting bolts and being rotatable about a horizontal axis, a pair of substantially inverted U-shaped bent wire members having a pair of legs, one leg of each of said bent wire members being connected to one of said pivot joints and being rotatable therein about a substantially vertical axis, an eyelet integrally formed at the free end of the other leg of each of said bent wire members, and a second pair of mounting bolts projecting outwardly from the opposite of said side walls and in registry with said first pair of mounting bolts, said bent wire members being rotatable in said pivot joints from a first position wherein said bent wire members afford a pair of hangers for said container to a second position wherein said eyelets releasably engage said second pair of mounting bolts, said bent wire members in said second position being rotatable about said pairs of mounting bolts and cooperating to afford a carrying handle for said container.

6. The container of claim 5 in which said pivot joint comprises a cylindrical sleeve having a longitudinal bore formed therethrough, said bore including an enlarged diameter portion affording an annular shoulder.

7. The container of claim 6 in which an enlarged head is provided at the end of said one leg of each of said bent wire members, said one leg being rotatably mounted in said bore and said enlarged head cooperating with said annular shoulder to operationally retain the same in said sleeve.

8. The container of claim 7 in which each of said bent wire members comprises a resilient member whereby said legs may be temporarily urged apart to achieve said second position.

9. The container of claim 5 in which said housing includes a pair of internal substantially vertical walls to afford three compartments therein.

10. A combination vehicular and portable container comprising an open-topped housing of integrally molded foam styrene or the like, said housing having a bottom wall and a pair of substantially vertical side walls connected by a pair of generally arcuate end walls, a pair of substantially vertical arcuate inner walls affording a central rectangular food compartment and a pair of substantially cylindrical liquid container compartments at each end of said housing, a removable cover of integrally molded foam styrene or the like associated with said housing, said cover including a plurality of depending ridges cooperating with the walls of said housing to render said compartments airtight, a metal reinforcing band girdling said bottom wall and side walls adjacent each of said liquid container compartments, a pair of mounting bolts projecting outwardly from one of said side walls and associated reinforcing bands, a pivot joint mounted on each of said mounting bolts and being rotatable about a horizontal axis, said pivot joint comprising a cylindrical sleeve having a longitudinal bore formed therethrough, said bore including an enlarged diameter portion affording an internal annular shoulder, a pair of resilient bent wire members of substantially inverted U-shape having a pair of legs, an enlarged head integrally formed on the end of one of the legs of each of said bent wire members, each of said legs being rotatably mounted in the bore of an associated sleeve and being rotatable therein about a substantially vertical axis, said enlarged heads cooperating with said annular shoulders to operationally retain said legs in said sleeves, an eyelet integrally formed at the free end of the other leg of each of said bent wire members, and a second pair of mounting bolts projecting outwardly from the opposite of said side walls and associated reinforcing bands and in registry with said first pair of mounting bolts, said bent wire members being rotatable from a first position wherein the same afford a pair of hangers for said container to a second position wherein said eyelets releasably engage said second pair of mounting bolts, said bent wire members in said second position being rotatable about said pairs of mounting bolts and cooperating to afford a carrying handle for said container.

11. A combination vehicular and portable container comprising an open-topped housing of integrally molded foam styrene or the like, said housing having a bottom wall and a pair of substantially vertical side walls connected by a pair of generally arcuate end walls, a pair of substantially vertical arcuate inner walls affording a central rectangular food compartment and a pair of substantially cylindrical liquid container compartments at each end of said housing, a removable cover of integrally molded foam styrene or the like associated with said housing, said cover including a plurality of depending ridges cooperating with the walls of said housing to render said compartments airtight, a non-insulated liquid container removably positioned in each of said liquid container compartments, and a pair of inverted U-shaped bent wire members rotatably connected to said housing, said bent wire members being selectively rotatable from a first position wherein they are connected to one of said side walls to afford a pair of hangers for said container to a second position wherein they are connected to both of said side walls and cooperate to afford a carrying handle for said container.

References Cited by the Examiner

UNITED STATES PATENTS

| 635,803 | 10/99 | Patteson | 206—4 |
| 1,586,020 | 5/26 | Witherspoon | 220—94 |
| 1,694,165 | 12/28 | Debacher | 220—94 |
| 2,645,392 | 7/53 | Gottsegan et al. | 224—42.01 |
| 2,755,838 | 7/56 | Kennedy | 220—94 |
| 2,961,124 | 11/60 | Hunter et al. | 220—104 |
| 3,061,157 | 10/62 | Moss | 224—42.01 |
| 3,081,865 | 3/63 | Pugsley. | |
| 3,093,238 | 6/63 | King | 206—4 |

HUGO O. SCHULZ, *Primary Examiner.*